Patented Mar. 25, 1952

2,590,632

UNITED STATES PATENT OFFICE 2,590,632

TERTIARY AMINE SALTS OF 3,7-DIAMINO-DIBENZOTHIOPHENEDIOXIDE 2,8-DISULFONIC ACID

Robert S. Long and Sien Moo Tsang, Bound Brook, N. J., assignors to American Cyanamid Company, New York, N. Y., a corporation of Maine No Drawing. Application June 15, 1950, Serial No. 168,379

9 Claims. (Cl. 260—290)

The present invention is concerned with a novel group of chemical reagents. More specifically, the present invention is concerned with diaminodisulfonic acids of the dibenzothiophenedioxide series. Still more specifically, it is concerned with amine salts of compounds of this series, with the preparation of these salts, and with the conversion of these salts to metallic salts thereof, and-or of the free acids.

As shown, for example, in the copending application of Mario Scalera and Dale Eberhart, Serial No. 45,425, filed August 20, 1948, now U. S. Patent No. 2,563,795, dated August 7, 1951, entitled "Dibenzothiophene Derivatives," sulfonic acids of acylated derivatives of dibenzothiophenedioxide, particularly the acyl amino derivatives, are useful as fluorescent brighteners for cellulosic materials. Unfortunately, despite the importance of this series of compounds, available methods for their preparation were not found satisfactory. In general, such methods were inadequate, either as to the yield produced, or as to the purity of the desired material, or both. For example, one of the more interesting compounds of this series, 3,7-diaminodibenzothiophenedioxide-2,8-disulfonic acid, is prepared by the sulfonation of benzidine, or of 3,7-diaminodibenzothiophenedioxide. However, the isolation of a pure product in the desired form from the sulfonation mixture is very difficult. When washing is attempted the free disulfonic acid tends to form a gelatinous mass, which is extremely difficult to free from sulfuric acid, or of the organic impurities, formed in the reaction.

These impurities consist, in large part, of monosulfonic acids, tri- and poly-sulfonic acids, undesired isomeric disulfonic acids, and the like. They are unsuitable and deleterious components in material to be used in the preparation of fluorescent compounds having the required brightness. The alkali salts, even if purified at the cost of repeated crystallizations, are still unsuited for many important uses of the compound; for example, acylation in organic solvents to form fluorescent brighteners. As a result of these difficulties, exploitation of materials of this series has tended to be limited, despite its outstanding commercial possibilities.

It is, therefore, the principal object of the present invention to overcome these problems. Such a solution to the difficulties should permit the isolation of the disulfonic acids, or a derivative thereof, in pure form, without extensive handling and purification steps. In addition, such a solution should provide a series of derivatives which are either useful per se, or readily converted to the desired form.

In general, these objects have been fulfilled surprisingly well by the preparation of monoamine salts, in particular, those derived from a tertiary base. These tertiary amine salts have been found to crystallize readily from aqueous solutions in pure form. They give a very clean separation from unwanted by-products of the sulfonation reactions. This result is particularly surprising in view of the fact that the compound itself is a disulfonic acid, and the impurities associated therewith are also organic sulfonic acids. It is surprising that out of complex mixtures of mono-, di- and tri-sulfonic acids, the monoamine salts of the desired disulfonic acid should precipitate in such a pure state from aqueous solutions of such mixtures.

Equally surprising is the fact that the conditions of separation are not critical, and excesses of free mineral acid or tertiary amine do no harm. It is not clearly understood why a disulfonic acid should form a mono-amine salt, and why this salt should precipitate in preference to either a diamine salt in the presence of excess amine, or in preference to the free acid (Zwitterion form) in acidic solution. Accordingly, the invention is not intended to be limited to any particular theory of operation. However, it is to be noted, that the polysulfonated by-products of the sulfonation reactions do not show this behavior. They give amine salts which are more highly soluble and which stay in solution, making separation of the compounds of the present invention both easy and highly effective.

It is a particular advantage of the present invention, also, that substantially any tertiary amine may be used. They may be amines of the aliphatic, aromatic, heterocyclic, or of mixed types. Such amines include, for example, triethyl amine, tributyl amine, dimethyl aniline, benzyldimethyl amine, pyridine, the picolines, ethylbenzylaniline, cyclohexyldimethyl amine, N-ethylmorpholine, N-ethylpiperidine, thiazole, and their homologs and nuclear-substitution products.

In utilizing the present invention to readily obtain pure salts, advantage is taken of the fact, noted above, that the salts crystallize readily from an acidic solution of the diaminodisulfonic acid. For example, the sulfonation mixture, in which the disulfonic acid was prepared, may be used immediately and without particular pretreatment of preparation of the amine salt. It is necessary only that the solution be diluted with water. According to the concentration conditions in the solution, a certain amount of evaporation may be advantageous subsequently. This is done, particularly, to obtain maximum yields of the salt. However, no special technique, other than those regularly known for such reactions is required in order to obtain a definite crystalline product, which is easily separated by filtration or other crystal separation operations. Amine salt crystals, or solutions of them, can be readily treated to prepare either alkali salts of the diaminodisulfonic acid or, if so desired, the free acids may be obtained. For example, by treatment with an aqueous alkali solution to liberate the amine, the alkali metal salt is formed. The amine is readily recovered, for example, by steam distillation, if so desired, and can thus be used again for purifying another batch of the diaminodisulfonic acids. However, it is an important advantage of the amine salts that such operations are not required. They are directly useful per se without further isolation or recovery steps, for many purposes. Illustratively, for example, in the preparation of the acylated derivatives, useful as brighteners for textile fabrics, as noted above, the amine salts can be used directly in the aqueous acylation reactions. In fact, they enable the acylation reactions to be carried out far more satisfactorily than on the free acid or an alkali salt thereof. This is shown and claimed, for example, in the copending application for United States Letters Patent, of Forster and Scalera, Serial No. 153,988, filed April 4, 1950, now U. S. Patent No. 2,573,652, dated October 30, 1951, and entitled, "Acylation of Aminosulfonic Acids of the Dibenzothiophene Series."

The invention will be more fully illustrated in conjunction with the accompanying examples set forth below. In these examples, all parts are by weight, unless otherwise noted.

*Example 1*

To 677 parts oleum there is gradually added, with vigorous stirring, 84.6 parts of dry finely divided benzidine sulfate. The temperature of the mixture is not allowed to exceed 65° C. After addition is complete, the solution is heated and stirred at 67° C. for 3 hours. There is then added 22.5 parts of 85% sulfuric acid and the mixture is rapidly heated to 140° C. and maintained at this temperature 2½ hours. It is then drowned into about 3,000 parts of water.

The drowned mixture is treated with 33.3 parts of triethylamine, and then heated to the boil. Enough water is then added to dissolve the yellowish opaque precipitate at the boil. The solution is clarified by filtration, cooled slowly to 24° C. and the precipitate of yellow needles filtered and sucked dry. The cake is washed twice with 100 parts 2% sulfuric acid, and then dried at 106° C. Thus is obtained a high yield of the mono triethylamine salt of 3,7-diaminodibenzothiophenedioxide - 2,8 - disulfonic acid. For most purposes, purification of the salt is unnecessary; it can, however, be recrystallized from 2% sulfuric acid. Because of the low solubility, large volumes are required.

*Example 2*

The sulfonation of benzidine is carried out exactly as described in the first paragraph of Example 1. The drowned mixture is treated with 26.4 parts of pyridine, heated to boil and diluted and filtered as described. The monopyridine salt separates on cooling in excellent yield. In appearance it is similar to the triethylamine salt though it is slightly more soluble in water and tends to separate in finer crystals than the triethylamine salt.

After drying, it can be used directly to prepare acylated derivatives. This is done by heating with an acid chloride in an organic solvent, according to the procedure of the above-noted application. Further, this salt may be treated with aqueous caustic and subjected to steam distillation to recover the pyridine, following which the disodium salt can be isolated in the usual manner; acidification with sulfuric acid gives the monosodium slat.

*Example 3*

A mixture of 12.3 parts of 3,7-diaminodibenzothiophenedioxide and 55 parts of 20% oleum is heated 1 hour at 155–160° C. It is then cooled and drowned in 1000 parts water, followed by 10.1 parts of triethylamine. The boiling mixture is further diluted as necessary to dissolve the solids present and then cooled. The mono triethylamine salt crystallizes from solution in excellent yield.

*Example 4*

A mixture of 56.4 parts benzidine sulfate and 452 parts 24.6% oleum is heated for 3 hours at 67° C. and then diluted with 15 parts of 85% sulfuric acid and heated at 140° C. for 3 hours. It is then drowned in water and treated with 18.6 parts of alpha-picoline. The salt is isolated substantially as described in the preceeding examples.

*Example 5*

To 150 parts of 35% oleum there is gradually added 28.2 parts of benzidine sulfate, the temperature being maintained below 30° C. The mixture is then gradually heated to 70° C. and maintained at this temperature for 2 hours. It is then heated to 140–5° C. and kept at this temperature 3 hours longer. The resulting mixture is drowned in 1000 parts of water, treated with 20.2 parts of triethylamine and brought to the boil. Enough water is added to dissolve the solid at the boil, bringing the whole to approximately the volume of 1800 parts of water. The solution is then cooled thoroughly and filtered from the crystals of the monotriethylamine salt of 3,7-diaminodibenzothiophene - 2,8 - disulfonic acid, which are washed with alcohol and dried.

*Example 6*

14.1 parts of benzidine sulfate is gradually added to 57 parts of 35% oleum, the temperature being maintained below 70°. When addition is complete the mixture is heated at 70° for 2 hours, followed by 3 hours at 140–5°. It is then cooled and diluted to the volume of 850 parts water, treated with 10.1 parts triethylamine, and refluxed to dissolve the solids. On cooling the crystalline triethylamine salt separates in good yield.

*Example 7*

85.1 parts of benzidine sulfate is added gradually to 677 parts of 26.8% oleum, the temperature being maintained no higher than 65° C. After completion of addition, the mixture is heated for 3 hours at 67° C., treated with 22.5 parts of 85% sulfuric acid, and then heated at 140° C. for 2½ hours. The resulting mixture is cooled to about 80° C., then diluted with 3000 parts water, heated to the boil, and diluted to the volume of about 11,000 parts of water. The solution is filtered with the aid of decolorizing charcoal and treated with 60 parts of tributylamine. The mixture is heated to the boil, cooled to room temperature, and worked up in the usual manner, giving the mono tributylamine salt of 3,7-diaminodibenzothiophenedioxide - 2,8 - disulfonic acid in the form of yellow needles.

Example 8

To 677 parts of 26.8% oleum is gradually added 85.1 parts of benzidine sulfate, the temperature being maintained below 65° C. The mixture is then stirred for 3 hours at 67° C., treated with 22.5 parts of 85% sulfuric acid, and then heated at 140° C. for 2½ hours. The resulting mixture is cooled to 80° C., drowned in 3000 parts of water, heated to the boil, and diluted to approximately the volume of 11,000 parts of water. After filtration there is aded 40 parts of dimethylaniline. The solution is heated to the boil and cooled. From it crystallizes yellow needles of the mono dimethylaniline salt of 3,7-diaminodibenzothiopheneoxide-2,8-disulfonic acid.

Example 9

The procedure of the preceding example is followed, replacing the dimethylaniline by 38 parts of N-ethyl morpholine. The corresponding N-ethyl morpholine salt is obtained in the same way.

Example 10

The procedure of Example 8 is followed, using instead of the dimethylaniline 70 parts of ethylbenzylaniline. The corresponding ethylbenzylaniline salt crystallizes in high yield in the form of yellow needles.

From the foregoing examples, it can be seen that no special sulfonating technique need be employed. The salt-forming tertiary amine is added to an aqueous solution of the mixture containing the desired disulfonic acid. Enough amine should be added to be at least sufficient to form the corresponding mono-amine salt. Addition should be made to the solution, either hot, or the solution should be heated thereafter, preferably to reflux temperature. Crystallization of the desired disulfonic acid salt is then, ordinarily, induced simply by cooling to room temperatures. It will be noted that this process can be applied directly to the solution resulting from the sulfonation reaction.

We claim:

1. A process for removing 3,7-diaminodibenzothiophenedioxide-2,8-disulfonic acid from a mixture thereof with at least one other organic sulfonic acid of the diaminodibenzothiophenedioxide series, which comprises: adding to an aqueous solution of the mixture a salt-forming tertiary amine, said amine being added in amount at least equimolar to said disulfonic acid, maintaining the resultant mixture under reactive conditions until salt-formation is substantially complete, crystallizing the resultant amine salt and collecting the crystals.

2. A process in accordance with claim 1 in which the mixture of sulfonic acids is obtained by sulfonating a substance selected from the group consisting of benzidine and 3,7-diaminodibenzothiophenedioxide.

3. A process in accordance with claim 1 in which the tertiary amine is triethyl amine.

4. A process in accordance with claim 3 in which the mixture of sulfonic acids is obtained by sulfonating a substance selected from the group consisting of benzidine and 3,7-diaminodibenzothiophenedioxide.

5. A process in accordance with claim 1 in which the tertiary amine is phyridine.

6. A process according to claim 5 in which the mixture of sulfonic acids is obtained by sulfonating a substance selected from the group consisting of benzidine and 3,7-diaminodibenzothiophenedioxide.

7. The monoamine salt of 3,7-diaminodibenzothiophenedioxide-2,8-disulfonic acid with a tertiary amine.

8. The monotriethyl amine salt of 3,7-diaminodibenzothiophenedioxide - 2,8 - disulfonic acid.

9. The monopyridine salt of 3,7-diaminodibenzothiophenedioxide-2,8-disulfonic acid.

ROBERT S. LONG.
SIEN MOO TSANG.

REFERENCES CITED

The following references are of record in the file of this patent:

Cullinane: Recueil Trav. Chim. Pays Bas, 55, 883–884, (1936).